United States Patent
Perez Barrera et al.

(10) Patent No.: US 10,082,796 B2
(45) Date of Patent: Sep. 25, 2018

(54) PEDESTRIAN FACE DETECTION

(71) Applicant: Ford Global Technologies, LLC, Dearborn, MI (US)

(72) Inventors: Oswaldo Perez Barrera, Texcoco (MX); Alvaro Jimenez Hernandez, Miguel Hidalgo (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 15/335,749

(22) Filed: Oct. 27, 2016

(65) Prior Publication Data

US 2018/0120858 A1 May 3, 2018

(51) Int. Cl.
| | |
|---|---|
| G08G 1/16 | (2006.01) |
| G05D 1/02 | (2006.01) |
| G05D 1/00 | (2006.01) |
| G06K 9/00 | (2006.01) |

(52) U.S. Cl.
CPC ....... *G05D 1/0246* (2013.01); *G06K 9/00228* (2013.01); *G06K 9/00805* (2013.01)

(58) Field of Classification Search
None
See application file for complete search history.

(56) References Cited

U.S. PATENT DOCUMENTS

| | | | |
|---|---|---|---|
| 8,514,100 B2 | 8/2013 | Yamashita | |
| 2004/0246114 A1 | 12/2004 | Hahn | |
| 2011/0234422 A1* | 9/2011 | Yamashita | B60Q 5/006 340/901 |
| 2014/0310379 A1 | 10/2014 | Ricci et al. | |
| 2016/0179094 A1 | 6/2016 | Sorokin et al. | |
| 2017/0277192 A1* | 9/2017 | Gupta | B60W 30/20 |

FOREIGN PATENT DOCUMENTS

| | | |
|---|---|---|
| DE | 102014215047 A1 | 2/2016 |
| EP | 2915715 A1 | 9/2015 |
| JP | 2010132151 A | 6/2010 |
| JP | 2011170663 A | 9/2011 |
| JP | 2012234499 A | 11/2012 |
| KR | 20170052713 A | 5/2017 |
| WO | 2017039925 A1 | 3/2017 |

OTHER PUBLICATIONS

Search Research from United Kingdom Intellectual Property Office dated Apr. 3, 2018 regarding Application No. GB1717268.5 (5 pages).

* cited by examiner

*Primary Examiner* — Adam D Tissot
(74) *Attorney, Agent, or Firm* — Frank A. MacKenzie; Bejin Bieneman PLC

(57) ABSTRACT

A controller for a vehicle is programmed to detect a pedestrian in an image received from a camera, determine whether a face of the pedestrian is present in the image, and cause the vehicle to change lanes based on the absence of the face.

18 Claims, 5 Drawing Sheets

PEDESTRIAN FACE DETECTION

BACKGROUND

Autonomous vehicles have the ability to operate without the intervention of a human operator, e.g., driver, that is, a computer controller makes decisions about accelerating, braking, and/or steering the vehicle. A vehicle may be fully autonomous or semi-autonomous. A semi-autonomous vehicle is one that is autonomous only in particular situations, for example, highway driving or parallel parking, or with respect to certain vehicle subsystems, for example, braking but not acceleration or steering.

An autonomous vehicle includes sensors for tracking an external environment surrounding the vehicle. Some types of sensors are radar sensors, scanning laser range finders, light detection and ranging (LIDAR) devices, and image processing sensors such as cameras. The controller is in communication with the sensors and uses output from the sensors to analyze the external environment, for example, defining features of a surrounding landscape, detecting roads and lanes of roads on the landscape, interpreting signs and signals, and detecting proximate objects.

DETAILED DESCRIPTION

Figure 1:
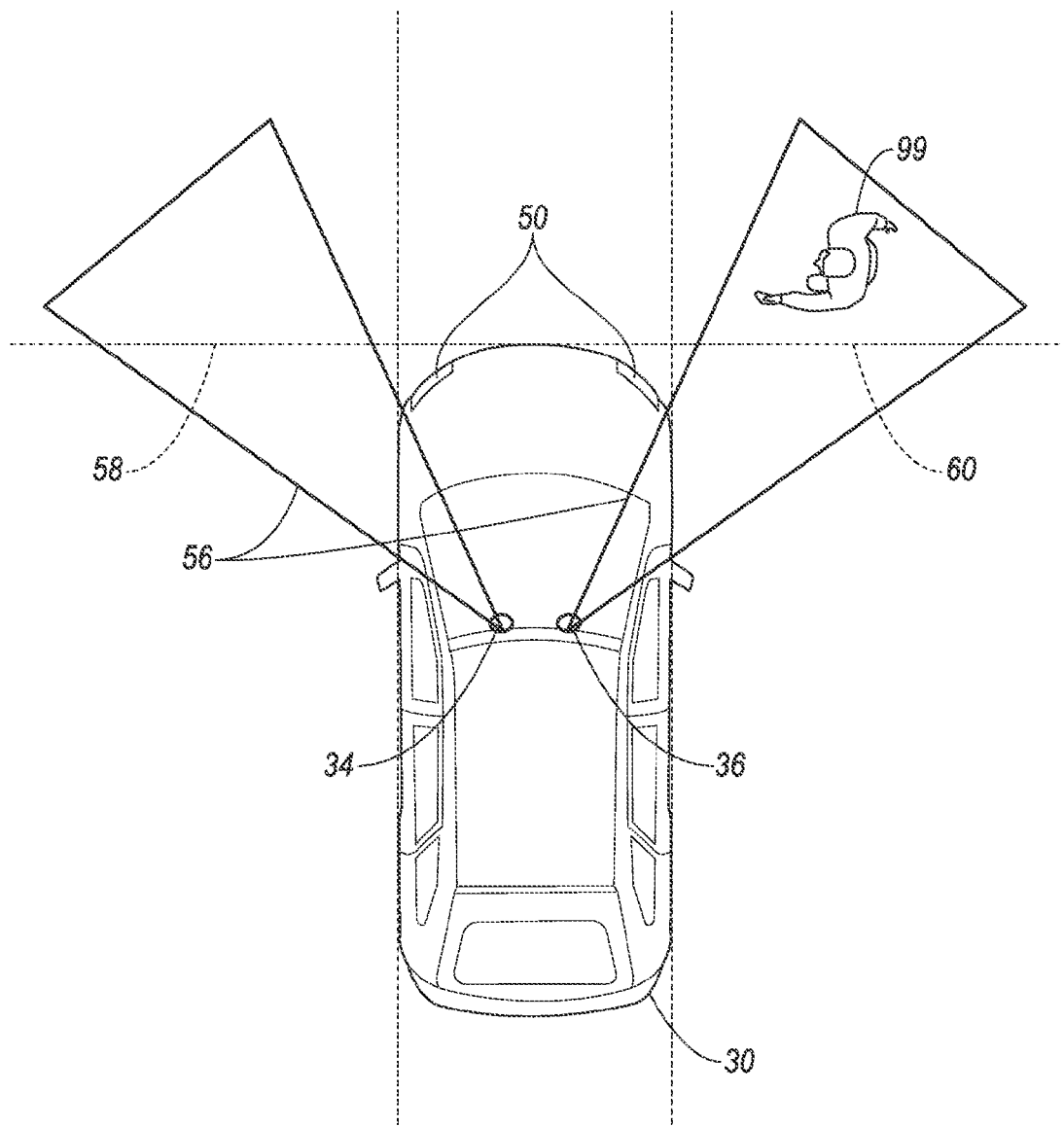
FIG. 1 is a top view of an example vehicle.
Figure 2:
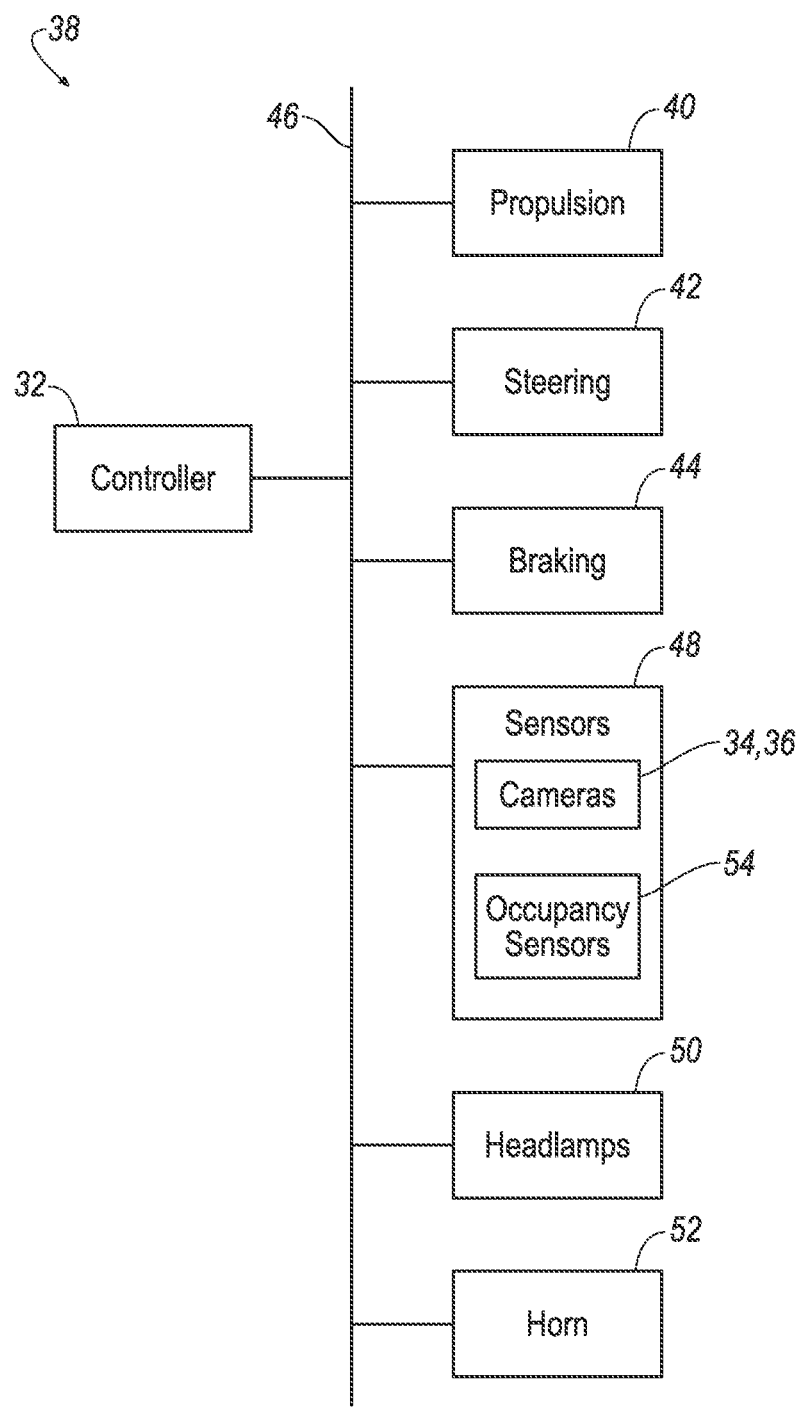
FIG. 2 is a block diagram of a control system of the vehicle of FIG. 1.

In the Figures, like numerals indicate like parts throughout the several views. Referring to FIGS. 1 and 2, a controller 32 for a vehicle 30 is programmed to detect a pedestrian 99 in an image received from a camera 34, 36, determine whether a face of the pedestrian 99 is present in the image, and cause the vehicle 30 to take an action based on whether a face is detected, e.g., change lanes based on an absence of the face.

The programming of the controller 32 improves an ability of the controller 32 to predict the intentions of pedestrians 99 and improves coordination between the vehicle 30 and other road users like pedestrians 99. For example, if the face of the pedestrian 99 is detected, then the pedestrian 99 is more likely to have seen the vehicle 30 and is less likely to cross in front of the vehicle 30. If the face of the pedestrian 99 is not detected, then the pedestrian 99 is less likely to have seen the vehicle 30. With that information, the controller 32 can take additional precautions when passing by the pedestrian 99, such as changing lanes to give the pedestrian 99 a wider berth.

Continuing with FIGS. 1 and 2, the vehicle 30 is an autonomous vehicle. The controller 32 may be capable of operating the vehicle 30 independently of the intervention of a human driver, completely, or to a greater or a lesser degree. The controller 32 may be programmed to operate propulsion 40, steering 42, brakes 44, and/or other vehicle systems.

With reference to FIG. 2, the controller 32 is included in a control system 38 for carrying out various operations, including as described herein. The controller 32 is a computing device that generally includes a processor and a memory, the memory including one or more forms of computer-readable media, and storing instructions executable by the processor for performing various operations, including as disclosed herein. The memory of the controller 32 further generally stores remote data received via various communications mechanisms; e.g., the controller 32 is generally configured for communications on a communications network 46, and/or for using other wired or wireless protocols, e.g., Bluetooth, etc. The controller 32 may also have a connection to an onboard diagnostics connector (OBD-II). Although one controller 32 is shown in FIG. 1 for ease of illustration, it is to be understood that the controller 32 could include, and various operations described herein could be carried out by, one or more computing devices.

The controller 32 may transmit and receive data through the communications network 46 such as a controller area network (CAN) bus, Ethernet, Local Interconnect Network (LIN), and/or by any other wired or wireless communications network. The communications network 46 may put the controller 32 in communication with the propulsion 40, the steering 42, the brakes 44, sensors 48 including the camera 34, 36, headlamps 50, and a horn 52.

The propulsion 40 of the vehicle 30 generates energy and translates the energy into motion of the vehicle 30. The propulsion 40 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 40 can include an electronic control unit (ECU) or the like that is in communication with and receives input from the controller 32 and/or from a human driver. The human driver may control the propulsion 40 via, e.g., an accelerator pedal and/or a gear-shift lever.

The steering 42 is typically a known vehicle steering subsystem and controls the turning of the wheels. The steering 42 can include an electronic control unit (ECU) or the like that is in communication with and receives input from a steering wheel and/or the controller 32. The steering 42 may be a rack-and-pinion system with electric power-assisted steering, a steer-by-wire system, as both are known, or any other suitable system.

The brakes 44 are typically a known vehicle braking subsystem and resist the motion of the vehicle 30 to thereby slow and/or stop the vehicle 30. The brakes 44 may be friction brakes such as disc brakes, drum brakes, band brakes, etc.; regenerative brakes; any other suitable type of brakes; or a combination. The brakes 44 can include an electronic control unit (ECU) or the like that is in communication with and receive input from the controller 32 and/or a human driver. The human driver may control the brakes 44 via, e.g., a brake pedal.

The vehicle 30 may include the sensors 48. The sensors 48 may detect internal states of the vehicle 30, for example, wheel speed, wheel orientation, and engine and transmission variables. The sensors 48 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 48 may detect the external world, for example, radar sensors, scanning laser range finders, light detection and ranging (LIDAR) devices, and image processing sensors such as the camera 34, 36. The sensors 48 may include communications devices, for example, vehicle-to-infrastructure (V2I) or vehicle-to-vehicle (V2V) devices.

With reference to FIG. 1, the camera 34, 36 may be disposed at a front end of the vehicle 30 or at a top of the vehicle 30. The camera 34, 36 may be facing in a generally vehicle-forward direction. The vehicle 30 may include multiple cameras 34, 36, which may face different directions.

Each camera 34, 36 has a field of vision 56, which is an entire view encompassed by the camera 34, 36 when the camera 34, 36 is pointed in a particular direction. The camera 34, 36 may have a field of vision 56 that includes an area 58, 60 in front of and outside a forward-projected width of the vehicle 30, in other words, an area 58, 60 in front of the vehicle 30 excepting where the vehicle 30 would travel if moving straight forward. If the vehicle 30 has multiple cameras 34, 36, the first camera 34 may have a field of vision 56 including an area 58 in front of and left of the forward-projected width of the vehicle 30, and the second camera 36 may have a field of vision 56 including an area 60 in front of and right of the forward-projected width of the vehicle 30.

The sensors 48 may include an occupancy sensor 54 configured to detect occupancy of the vehicle 30. The occupancy sensor 54 may be visible-light or infrared cameras directed at one or more of the seats, weight sensors inside the seats, sensors detecting whether seatbelts for the seats are buckled or unspooled, or other suitable sensors. The occupancy sensor 54 is in communication with the controller 32 via the communications network 46.

The headlamps 50 may be fixed relative to the vehicle 30 and disposed at a front end of the vehicle 30 facing in a vehicle-forward direction. The headlamps 50 may be any lighting system suitable for illuminating a roadway in front of the vehicle 30, including tungsten, halogen, high-intensity discharge (HID) such as xenon, light-emitting diode (LED), laser, etc. The headlamps 50 may be stationary or adaptive, that is, capable of rotating relative to the vehicle 30.

The horn 52 produces a sound when actuated. The sound may resemble a "honk" and is loud enough to generally be perceived by other vehicles, pedestrians 99, cyclists, etc. in the vicinity of the vehicle 30.

Figure 3:
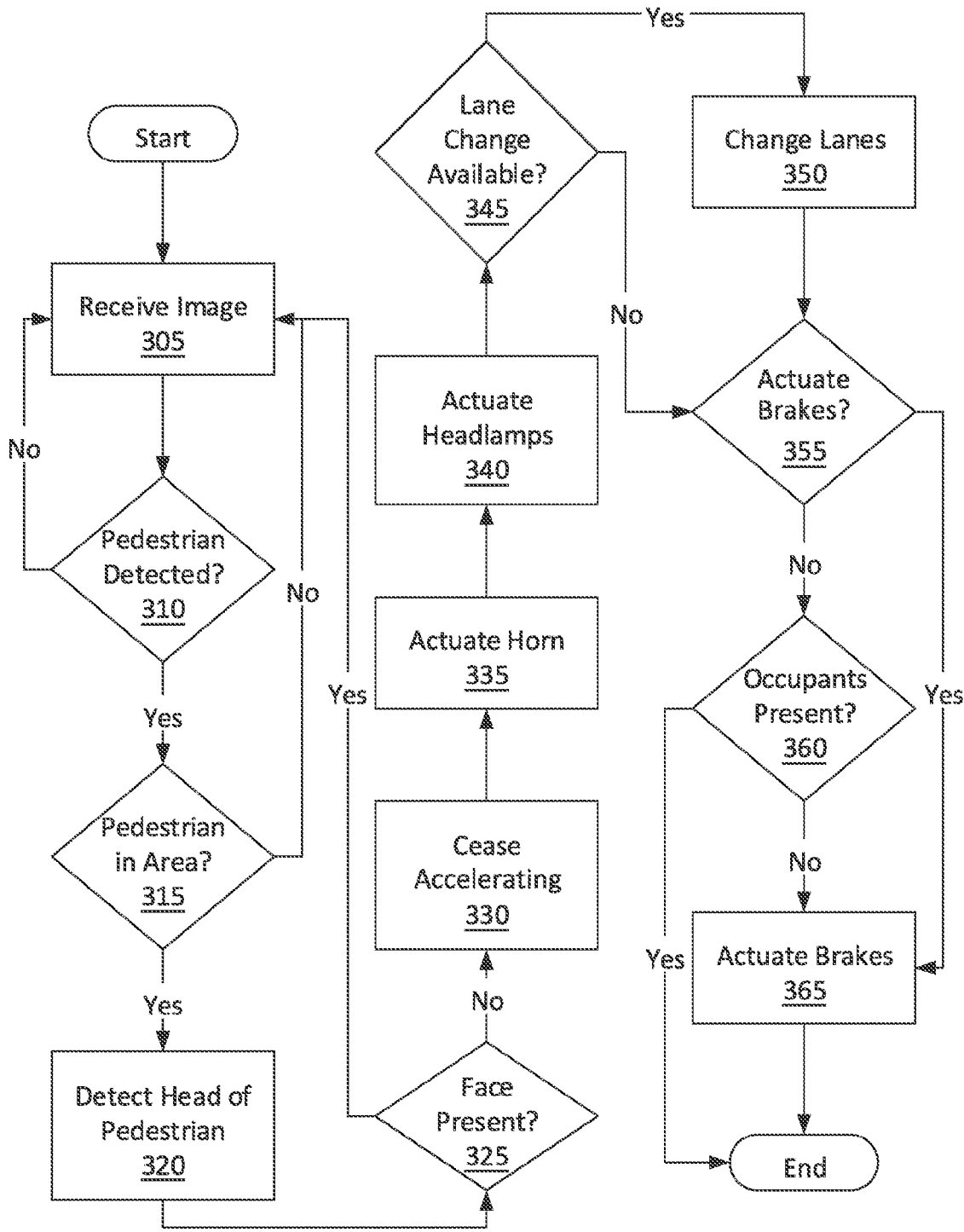
FIG. 3 is a process flow diagram for an exemplary process for reacting to a pedestrian.

FIG. 3 is a process flow diagram illustrating an exemplary process 300 for reacting to a pedestrian 99. The controller 32 may run the process 300 when the vehicle 30 is operating autonomously and approaching an intersection, crosswalk, etc. The process 300 begins in a block 305, in which the controller 32 receives an image through the communications network 46 from the one or more cameras 34, 36.

Figure 4:
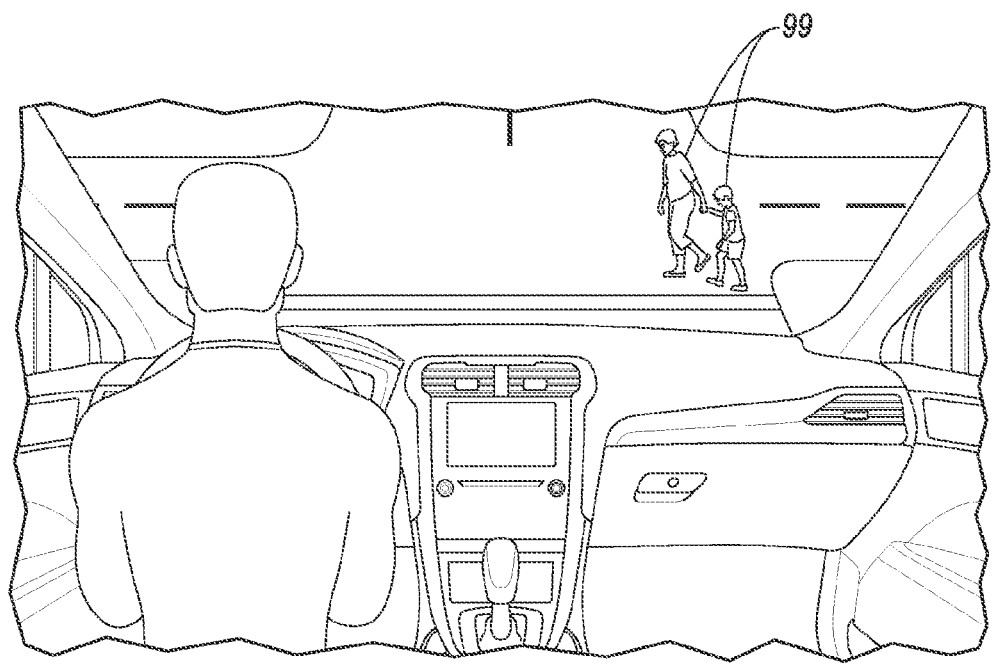
FIG. 4 is an example image from a camera of the vehicle of FIG. 1.

Next, in a decision block 310, the controller 32 detects whether a pedestrian 99 is present in the image received from the cameras 34, 36. FIG. 4 shows an example image from the camera 34, 36 including two pedestrians 99. The controller 32 typically uses known techniques for object detection and classification to analyze such images, e.g., to determine a presence or absence of a pedestrian. The controller 32 may analyze a still image and/or a sequence of images or video to detect whether a pedestrian 99 is present in the image received from the camera 34, 36. If a pedestrian 99 is not detected, the process 300 proceeds back to the block 305 to receive another image and restart the process 300.

If a pedestrian 99 is detected, next, in a decision block 315, the controller 32 determines whether the pedestrian 99 is located in one of the areas 58, 60 in front of and outside the forward-projected width of the vehicle 30. If the pedestrian 99 is not located in one of the areas 58, 60, the process 300 returns to the block 305 to receive another image and restart the process 300. If the pedestrian 99 is specifically located in the forward-projected width of the vehicle 30, then pedestrian 99 is not located in one of the areas 58, 60, but the controller 32 may use a separate collision avoidance algorithm, as is known, to decide which actions to perform.

If the pedestrian 99 is located in one of the areas 58, 60 in front of and outside the forward-projected width of the vehicle 30, next, in a block 320, the controller 32 detects the head of the pedestrian 99 in the image based on detecting the pedestrian 99. The controller 32 typically uses known techniques for object detection and classification, e.g., to identify a head of a human being in an image.

Figure 5A:
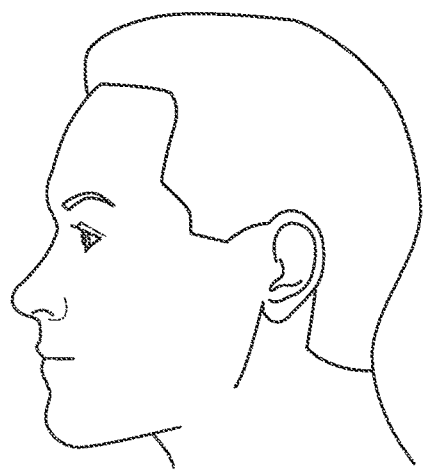
FIGS. 5A-C are example heads of pedestrians from images from the camera of the vehicle of FIG. 1 in which faces are not detected.
Figure 5B:
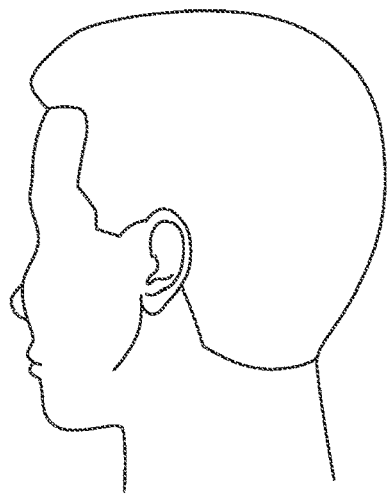
Figure 5C:
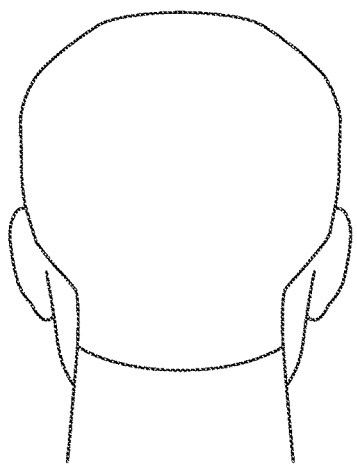
Figure 5D:
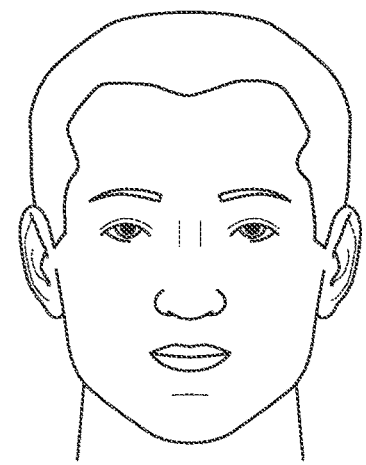
FIGS. 5D-E are example heads of pedestrians from images from the camera of the vehicle of FIG. 1 in which faces are detected.
Figure 5E:
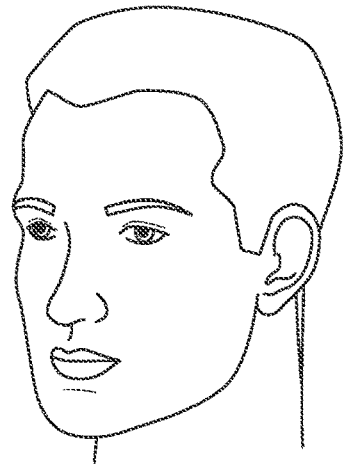

Next, in a decision block 325, the controller 32 determines whether a face of the pedestrian 99 is present in the image. Specifically, the controller 32 may determine whether a face of the pedestrian 99 is present by determining whether two eyes of the pedestrian 99 are present in the image, typically using known image-analysis techniques. FIGS. 5A-C show heads of pedestrians for which the controller 32 would find no face present, and FIGS. 5D-E show heads of pedestrians for which the controller 32 would find faces present. If the controller 32 determines that a face of the pedestrian 99 is present in the image, then the pedestrian 99 is more likely to be aware of the vehicle 30, and the process 300 proceeds back to the block 305 to receive another image and restart the process 300.

If the controller 32 determines that a face of the pedestrian 99 is absent in the image, next, in a block 330, the controller 32 actuates the propulsion 40 to cease accelerating based on the absence of the face.

Next, in a block 335, the controller 32 actuates the horn 52 to sound based on the absence of the face. The sound of the horn 52 may alert the pedestrian 99 that the vehicle 30 is nearby.

Next, the controller 32 actuates the headlamps 50 to illuminate based on the absence of the face. The light of the headlamps 50 may alert the pedestrian 99 that the vehicle 30 is nearby.

Next, in a decision block 345, the controller 32 determines whether a lane change away from the pedestrian 99 is available. Specifically, as is known, the controller 32 may determine whether a lane is present that is traveling the same direction as the vehicle 30 and on the opposite side of the vehicle 30 than the pedestrian 99, and if so, the controller 32 may determine whether the lane has sufficient space free of vehicles or other obstacles. If a lane change is available, the process 300 proceeds to a block 350. If a lane change is not available, the process 300 proceeds to a decision block 355.

After the decision block 345 if a lane change is available, in the block 350, the controller 32 causes the vehicle 30 to change lanes based on the absence of the face of the pedestrian 99 in the image. Techniques for controlling a vehicle 30 to change lanes are known. As a result, the vehicle 30 may pass farther away from the pedestrian 99 than without the lane change.

After the decision block 345 if a lane change was not available, and after the block 350 if a lane was available, in the decision block 355, the controller 32 determines whether to actuate the brakes 44. For example, the controller 32 may determine based on object tracking of the pedestrian 99 whether the pedestrian 99 has a trajectory leading him or her in front of the vehicle 30. If braking is not to be initiated, then the process 300 proceeds to a decision block 360. If braking is to be initiated, then the process 300 proceeds to a block 365.

After the decision block 355 if braking is not to be initiated, in the decision block 360, the controller 32 determines whether the vehicle 30 contains occupants. The controller 32 may receive a signal indicating occupancy through the communications network 46 from the occupancy sensor 54. If the vehicle 30 contains occupants, the process 300 ends. If the vehicle 30 does not contain occupants, the process 300 proceeds to a block 365.

After the decision block 355 if braking is to be initiated or after the decision block 360 if braking was not to be initiated and the vehicle 30 does not contain occupants, in the block 365, the controller 32 actuates the brakes 44 to brake based on the absence of the face of the pedestrian 99 in the image and possibly on the absence of occupants. After the block 365, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller for a vehicle, comprising a processor and a memory storing processor-executable instructions, the processor programmed to:
   detect a pedestrian in a camera image;
   determine whether a face of the pedestrian is present in the image;
   detect a lane adjacent the vehicle and on an opposite side of the vehicle from the pedestrian;
   determine that the adjacent lane has sufficient space free of obstacles;
   cause the vehicle to change lanes based on an absence of the face and on the adjacent lane having sufficient space free of obstacles;
   maintain the vehicle in a present lane based on a lack of the adjacent lane, the adjacent lane having insufficient space free of obstacles, or the presence of the face;
   determine whether the vehicle contains occupants; and
   actuate brakes to brake based on the absence of the face and an absence of occupants.

2. The controller of claim 1, further programmed to determine whether the pedestrian is located in an area in front of and outside a forward-projected width of the vehicle.

3. The controller of claim 2, wherein the programming to determine whether a face of the pedestrian is present in the image includes programming to determine whether a face of the pedestrian is present in the image if the pedestrian is located in the area.

4. The controller of claim 1, wherein the programming to determine whether a face of the pedestrian is present in the image includes programming to determine whether two eyes of the pedestrian are present in the image.

5. The controller of claim 1, further programmed to detect a head of the pedestrian based on detecting the pedestrian.

6. The controller of claim 1, further programmed to actuate a horn to sound based on the absence of the face.

7. The controller of claim 1, further programmed to actuate a headlamp to illuminate based on the absence of the face.

8. The controller of claim 1, further programmed to actuate a propulsion to cease accelerating based on the absence of the face.

9. The controller of claim 1, further programmed to actuate brakes to brake based on the absence of the face.

10. A control system comprising:
    a camera having a field of vision including an area in front of and outside a forward-projected width of a vehicle; and
    a controller programmed to:
       detect a pedestrian in the area based on an image received from the camera;
       determine whether a face of the pedestrian is present in the image;
       detect a lane adjacent the vehicle and on an opposite side of the vehicle from the pedestrian;
       determine that the adjacent lane has sufficient space free of obstacles;
       cause the vehicle to change lanes based on an absence of the face and on the adjacent lane having sufficient space free of obstacles;
       maintain the vehicle in a present lane based on a lack of the adjacent lane, the adjacent lane having insufficient space free of obstacles, or the presence of the face;
       determine whether the vehicle contains occupants; and
       actuate brakes to brake based on the absence of the face and an absence of occupants.

11. The control system of claim 10, wherein the programming to determine whether a face of the pedestrian is present in the image includes programming to determine whether two eyes of the pedestrian are present in the image.

12. The control system of claim 10, wherein the controller is further programmed to detect a head of the pedestrian based on detecting the pedestrian.

13. The control system of claim 10, wherein the controller is further programmed to actuate a horn to sound based on the absence of the face.

14. The control system of claim 10, wherein the controller is further programmed to actuate a headlamp to illuminate based on the absence of the face.

15. The control system of claim 10, wherein the controller is further programmed to actuate a propulsion to cease accelerating based on the absence of the face.

16. The control system of claim 10, wherein the controller is further programmed to actuate brakes to brake based on the absence of the face.

17. A method comprising:
    detecting a pedestrian in a camera image;
    determining whether a face of the pedestrian is present in the image;
    detecting a lane adjacent the vehicle and on an opposite side of the vehicle from the pedestrian;
    determining that the adjacent lane has sufficient space free of obstacles;
    causing a vehicle to change lanes based on an absence of the face and on the adjacent lane having sufficient space free of obstacles;
    maintaining the vehicle in a present lane based on a lack of the adjacent lane, the adjacent lane having insufficient space free of obstacles, or the presence of the face;
    determining whether the vehicle contains occupants; and
    actuating brakes to brake based on the absence of the face and an absence of occupants.

18. The method of claim 17, further comprising determining whether the pedestrian is located in an area in front of and outside a forward-projected width of the vehicle.

* * * * *